United States Patent Office 3,666,411
Patented May 30, 1972

3,666,411
PROCESS FOR MANUFACTURE OF
ALUMINA HYDRATE
Carroll Wayne Collier, 507 E. 2nd St.,
Harrison County, Miss. 39571
Filed Sept. 24, 1969, Ser. No. 860,762
Int. Cl. C01f 7/42; B01j 11/06, 11/60
U.S. Cl. 23—143                            3 Claims

ABSTRACT OF THE DISCLOSURE

Preparation of particulate hydrated alumina by commingling particles of metallic aluminum and an aqueous solution of an alkali metal cyanide, tetraborate or hydroxide at a reacting temperature, the ratio of gram moles of electrolyte to gram atoms of aluminum being between about 0.1 to 1 and 1 to 1. The resulting products have an apparent bulk density of 0.2 to 0.5 gram/cc.

Figure 1:
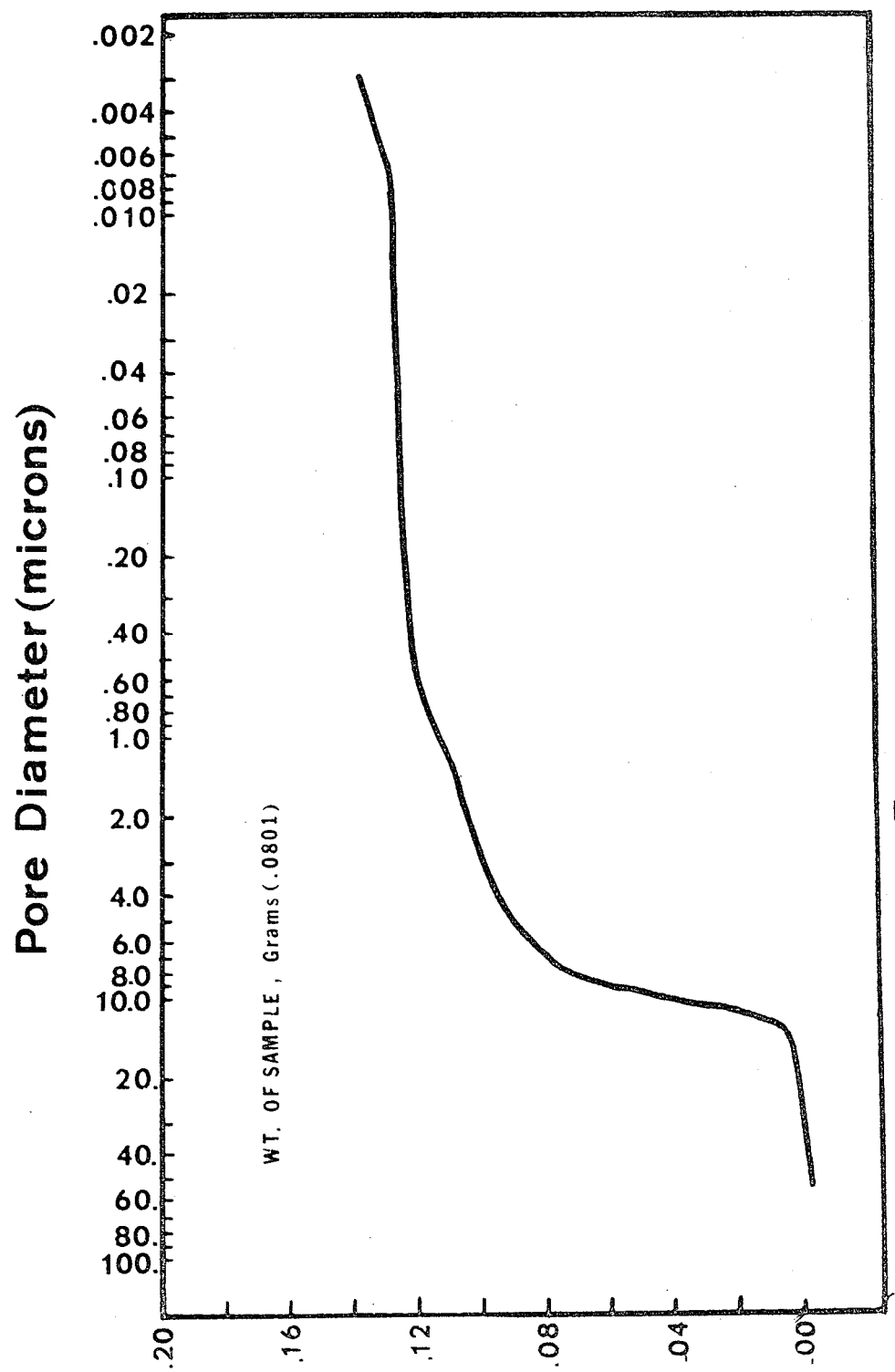
Figure 2:
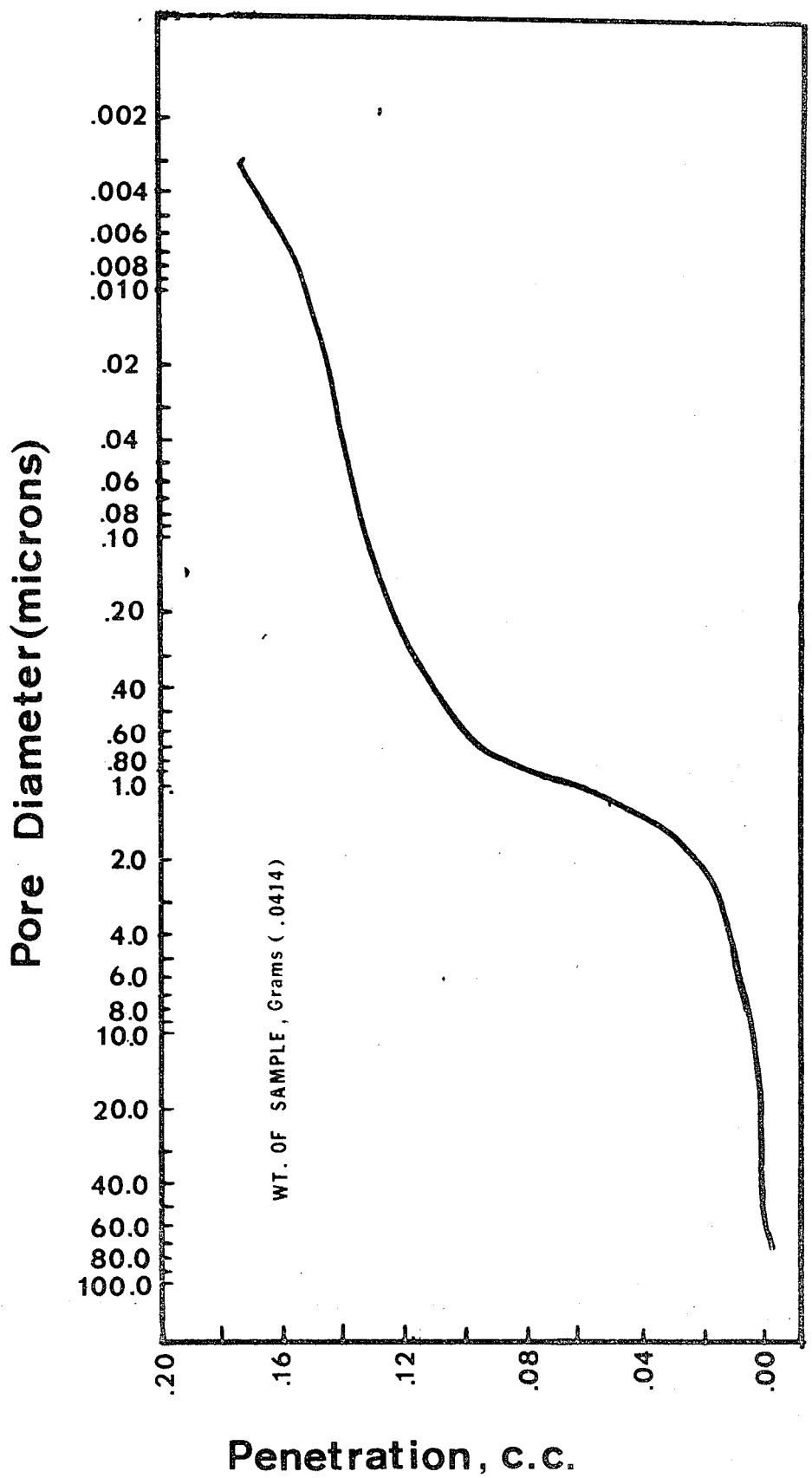

The invention relates to a process for the production of hydrated aluminum oxides and the products so produced.

Alumina hydrates have been produced in the past from ores such as bauxite in a two-step process by reaction with caustic soda wherein the first step comprises solution of the bauxite in concentrated caustic at high temperature, followed, after removal of insoluble impurities, by partial precipitation of the alumina hydrate at a lower concentration of caustic soda and at a lower temperature. This is often referred to as the Baeyer process. Among the disadvantages of this process are the necessity of large quantities of energy for regeneration of the dilute liquors by evaporation, incomplete precipitation of the alumina in each cycle, and production of product not directly suited for many end-uses of the alumina developed since this process was devised. A further disadvantage of the process is that it is inherently slow and long reaction times are required. Furthermore, the alumina product contains varying amounts of sodium ion, from the sodium aluminate solution. Even after repeated washings, this residual amount is usually about 0.5 to about 0.7 percent. A further disadvantage of the process is that the solution from which the alumina is precipitated contains from 1.5 to 1.8 atom ratio of sodium ion to aluminum ion, only one-half of which is precipitated as alumina.

For use as abrasives and refractories alumina hydrates prepared as above have been satisfactory. More recently, applications requiring alumina hydrates or anhydrous aluminum oxides having different physical properties have developed.

For example, the catalytic use of alumina either as a catalyst support or as the catalyst itself finds wide usage in the petroleum industry and other industries where surface catalysis is employed. Certain current methods for lessening or modifying auto exhaust pollutants incorporate, in the exhaust system, catalytic materials, all or a portion of which are alumina. Important criteria for suitability of alumina in these applications include surface area, bulk density, pore volume and pore size distribution. Modern analytical methods such as thin layer chromatography and column chromatography also utilize, among another substrates, alumina and alumina hydrates as adsorbents or as carriers for a liquid partitioning phase. Here again certain of these criteria are critical to its utility. In appropriate form aluminas are extensively employed as adsorbents for removing extraneous materials from liquid or vapor streams, such as moisture and pollutants.

Aluminas having narrow ranges of macro size pore diameters have special utility in porous frit filters and as controlled capillary agents. Examples of the latter would be "oilless" bearings and marking pen tips where liquid retention and flow characteristics are closely connected with pore size of the retaining substrate. Materials having low relative surface area, high macropore volumes and low micropore volumes should be readily obtainable by controlled high temperature sintering of the subject aluminas. These should be particularly useful for inert type catalyst carriers and as inert liquid phase supports for gas-liquid and liquid-liquid partition chromatography.

Specialty abrasives, e.g. those used in dentifrices, also require specific surface and shape characteristics. These in turn are directly related to the method of manufacture and to the starting alumina hydrate substance.

Alumina is also produced from precipitated gels which result when aqueous solutions of aluminum salts are made basic with alkaline reacting substances such as caustic or ammonia. More recently it has been suggested that alumina hydrates can be produced directly from aluminum metal. The majority of such suggestions apply activators, such as amalgamation or other alloying techniques, activators in solution, such as aluminum salts, organic nitrogenous compounds, silicon tetrachloride and the like. In the methods using amalgamation or alloying techniques, such extraneous metal appears in the product and as a result a significant body of literature has developed directed to means for removing such contaminants by later reactions. The same problem exists in certain of the other prior methods enumerated above.

Furthermore, in many such processes the alumina hydrate forms as an adherent coating on the surface of the aluminum being reacted, or even on the surface of the reaction vessel and mechanical means for removal must be empoyled. A special adaptation of the latter is the solution of aluminum by a stoichiometric amount of caustic soda, and deposition by autohydrolysis of an adherent alumina hydrate coating on a co-present metal surface.

It is therefore an object of this invention to provide a one-step process for the manufacture of particulate hydrated alumina which is economic of raw materials and provides the product in a form suitable for a diversity of uses and of such purity that subsequent purification steps are not required. It is also an object of this to provide the product so-produced.

The following is a detailed description of the invention taken in conjunction with the drawings in which FIG. I is a graph depicting the pore size distribution of an aluminum oxide product prepared as described in Example I and FIG. II is a graph depicting the pore size distribution of an aluminum oxide product prepared as described in Example II.

The above and other objects are obtained by introduction of finely divided metallic aluminum into an aqueous solution of an alkaline reacting inorganic electrolyte which can be present in amounts less than the stoichiometric equivalent of the aluminum reacted, while subjecting the reaction mixture to sufficient agitation to maintain the reacting aluminum and hydrated alumina produced in suspension. As cations in the alkaline reacting electrolytes used in the process of the invention, the alkali metals are employed, common examples being sodium and potassium ions. The anion selected for this process is chosen to provide an alkaline reacting medium. Preferred anions are selected from the group consisting of hydroxide, tetraborate, and cyanide. The temperature employed in the process depends to some extent on the nature and concentration of the anion, as well as the state of subdivision of the aluminum. For the hydroxyl ion threshold, reaction temperatures of about 104° F. can be employed. For cyanide a slightly higher temperature is needed and for borate, still higher temperatures are needed. The upper temperature normally employed is the atmospheric boiling point of the aqueous solution, that is about 212° F. However, temperatures as high as 400° F. can be employed if the reaction vessel is provided with means for increasing the reaction pressure above atmospheric. In general, with the exception of the rapid reaction of alkali hydroxides on fine aluminum powders, the process can only be sustained by additional heat input from an external source. Reaction times for completion of the transformation are likewise dependent variables based on temperature, the nature of the alkaline reacting electrolyte and the particle size of the reacting aluminum and will ordinarily range between 1 and 30 hours.

The ratio of the electrolyte employed to aluminum can vary over reasonably wide limits, but in general is between about 0.1 to 1 and 1 to 1. The nature of the aluminum metal, while not critical, can be selected to control the duration and rate of the reaction and to a lesser extent the particle size. This in turn affects the apparent or bulk density of the dried product. However it has been found that a wide range of paste and powder forms of aluminum can be employed resulting in products having apparent bulk densities in the range of 0.2 to 0.5 gram/cc. Most processes of the prior art, including the Baeyer process, provide material having bulk densities twice or more these values. Many grades of metallic aluminum are suitable, and are described in the industry as non-leafing, tinting, or leafing grades, varying from through 40 mesh to through 400 mesh (U.S. Standard Sieve size). Of these, the atomized grades are preferred wherein the average particle diameter varies from about 12 microns to about 26 microns. A suitable atomized aluminum powder is Atomized Powder No. 123 sold by The Aluminum Company of America and produced by blowing molten aluminum through atomizing nozzles and collecting the product in a dust collector. It is then screened through a 200 mesh commercial screen. The product is non-leafing, has average mesh size data of less than 1% on 200 mesh and 93% through 325 mesh, has an average particle diameter of 16 microns and has an approximate specific gravity of 2.71. In general, the pore volume of these products as determinable by standard mercury porosimetry methods, ranges from 2 to 10 times the volume of other commercially available forms. The following examples are presented to illustrate typical embodiments of the process of this invention; but not with the intention of unduly limiting the same.

EXAMPLE I

To a 40 gallon corrosion resistant metal reactor provided with means for agitation, heating and removal of the hydrogen gas by-product and with temperature recording means was added 30 gallons of water and 906 grams (22.65 gram moles) of sodium hydroxide, providing approximately a 0.79 weight percent solution. With the agitator in motion the contents of the vessel were heated to a temperature of 46° C., after which no further heat was applied. At this temperature 1500 grams (55.55 gram atoms of Atomized Powder No. 123) were added over a period of three minutes. A vigorous but easily controlled reaction occurred with evolution of hydrogen gas. The reaction mixture was vigorously agitated for a period of three hours with no further heating. Temperature rose to a maximum of 58° C. and at the end of this period was still 55° C. At the end of this period the reaction was complete and the white particulate alumina hydrate was removed by filtration and washed with water. After air drying, the material had an apparent gravity of 0.5 gram/cc. A total weight of 3250 grams was obtained.

Examination of the interior walls of the reaction vessel and of the mixer shaft and blades showed no deposition of alumina on the surfaces. There was no indication of unreacted aluminum. The product from the foregoing example was activated at 350° C. to provide a substantially pure aluminum oxide. The surface area of this material by B.E.T. adsorption measurement was 77 m.$^2$/gram. Pore size distribution is shown in FIG. I. Measured pore volume was 1.67 cc./gram.

EXAMPLE II

The process of Example I was repeated employing 600 grams of sodium borate decahydrate (1.57 gram moles) in 8 gallons of water as the electrolyte. The mixture was brought to the boiling point (ca. 214° F.) and 200 grams of Atomized Powder No. 123 added over a period of five minutes. Vigorous agitation and heating at the boiling point was continued for a period of one and three quarters hours, at the end of which the reaction vessel and of the mixer shaft and blades again showed no deposition of alumina hydrate on the surfaces. There was no indication of unreacted aluminum. The white alumina hydrate was removed by filtration and washed with water. After air drying, the material had an apparent gravity of 0.19 gram/cc. A total weight of 527 grams was obtained. The product from the foregoing example was activated at 350° C. to provide a substantially pure aluminum oxide. The surface area of this activated material, by B.E.T. adsorption, was 366 m.$^2$/gram. Pore size distribution is shown in FIG. II. Measured pore volume was 4.17 cc./gram.

EXAMPLE III

The process of Example I was repeated employing 8 grams of sodium cyanide (.161 gram mole) as the electrolyte. With the reaction mixture at an initial temperature of 70° C. was continued for five hours at the end of which the reaction was substantially complete. Examination of the interior walls of the reaction vessel and of the mixer shaft and blades showed no deposition of alumina on the surfaces. There was no indication of unreacted aluminum. The white alumina hydrate was removed by filtration and washed with water. After air drying, the material had an apparent gravity of 0.5 gram/cc. A total weight of 10 grams was obtained.

I claim as my invention:

1. A process for the manufacture of particulate hydrated alumina which comprises commingling particulate metallic aluminum and an aqueous solution of an alkali metal tetraborate wherein the ratio of gram moles of tetraborate to gram atoms of aluminum is between about 0.1 to 1 and 1 to 1 and recovering the resulting hydrated alumina.

2. A process as claimed in claim 1 wherein said particulate metallic aluminum is of 40–400 mesh size.

3. A process as claimed in claim 1 wherein said alkali metal is sodium.

References Cited

UNITED STATES PATENTS 3,494,733    2/1970    Keith et al. _____ 23—143

OTHER REFERENCES

Weast, Handbook of Chemistry and Physics, 47th edition, 1966, p. D–80.

MILTON WEISSMAN, Primary Examiner

U.S. Cl. X.R.

252—463; 23—2 E